Feb. 3, 1970   ÅGE E. RÖED   3,493,198
AERODYNAMIC LANDING ROLL BRAKING OF TURBOJET POWERED AIRCRAFT
Filed Dec. 20, 1968   4 Sheets-Sheet 1

Åge Eilef Röed

United States Patent Office 3,493,198
Patented Feb. 3, 1970

3,493,198
AERODYNAMIC LANDING ROLL BRAKING OF TURBOJET POWERED AIRCRAFT
Åge E. Röed, Jonkoping, Sweden, assignor to Saab Aktiebolag, Linkoping, Sweden, a corporation of Sweden
Filed Dec. 20, 1968, Ser. No. 785,565
Int. Cl. B64c 15/04; B64d 27/18; F02k 1/20
U.S. Cl. 244—53                5 Claims

ABSTRACT OF THE DISCLOSURE

In a fixed wing aircraft powered by turbojet engines in underwing nacelles, aerodynamic landing roll braking is effected by deflecting engine exhaust gases upwardly into a spanwise extending plenum chamber in the wing whence they issue through narrow, spanwise extended nozzles near the trailing edge as flow sheets moving obliquely forwardly-upwardly over the wing. In addition to decelerating and wheel loading reaction force components, induced downward and rearward forces are generated.

---

This invention relates to fixed wing aircraft powered by turbojet engines, and more particularly to means for utilizing such an engine to effect aerodynamic braking of an airplane during its landing roll.

Means are known for effecting deflection of the exhaust gases of turbojet engines in a generally forward direction to enable such engines to be used for aerodynamic braking during the landing roll.

However, the expedients for this purpose that were previously available had certain marked disadvantages. Generally they did not utilize the power of the engine efficiently, in that they deflected a substantial portion of its exhaust gases in opposite directions transverse to the direction of airplane motion so that much of the available thrust of the engine was wasted in producing forces which merely cancelled one another. In addition, some of the prior arrangements gave rise to effects which unfavorably influenced operation of the engines, such as encouraging recirculation of exhaust gases through the engine. In certain cases where exhaust gases were deflected forwardly and downwardly, an upward thrust component was produced that reduced the rolling friction of the wheels and thereby interfered with normally available deceleration forces; and in all such cases the forwardly and downwardly deflected exhaust gases could blow up loose material from the ground to be sucked into the engines and possibly damage them.

By contrast, it is the general object of the present invention to provide improved means for so deflecting exhaust gases from a turbojet engine during the landing roll as to achieve a highly efficient utilization of the reaction forces available from such gases while taking advantage of certain supplementary aerodynamic phenomena that further contribute to deceleration and while also insuring maintenance of a substantial load on the wheels so that rolling friction makes its due contribution to deceleration.

Another and more specific object of this invention is to provide means in a fixed wing aircraft powered by a turbojet engine for deflecting all of the exhaust gases from the engine over the top surface of the wing in the form of a spanwise extending sheet or flow curtain that emanates from near the trailing edge of the wing and flows over the wing at a forward and upward inclination, so that said flow curtain cooperates with the wing to form a wedge-like forwardly opening pocket that catches the air moving relatively rearwardly over the wing and thereby produces an overpressure on the upper surface of the wing while causing the flow around the wing to separate and afford increased drag.

It is also an object of this invention to provide means in a fixed wing aircraft normally propelled by a turbojet engine for utilizing the engine to effect landing roll deceleration of the aircraft without incurring risk of recirculation of engine exhaust gases or of producing other conditions that might detract from the efficiency and reliability of the engine.

With these observations and objects in mind, the manner in which the invention achieves its purpose will be appreciated from the following description and the accompanying drawings. This disclosure is intended merely to exemplify the invention. The invention is not limited to the particular structure or method disclosed, and changes can be made therein which lie within the scope of the appended claims without departing from the invention.

The drawings illustrate several complete examples of the physical embodiment of the invention constructed according to the best modes so far devised for the practical application of the principles thereof, and in which.

Figures 1, 2:
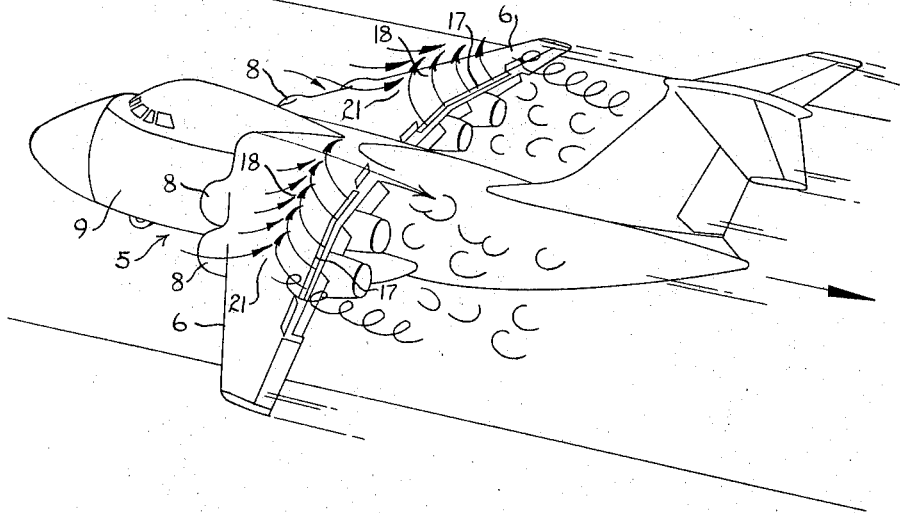
FIGURE 1 is a perspective view of an airplane embodying the principles of this invention illustrated during its landing roll and with portions of the air and exhaust gas flow in its vicinity indicated diagrammatically.
FIGURE 2 is a vertical sectional view of the same airplane, on an enlarged scale, taken chordwise through the wing and an engine nacelle and looking inboard toward the fuselage.

In the several drawings, the numeral 5 designates generally an aircraft which has a fixed wing 6 and which is powered by turbojet engines 7 that are housed in nacelles 8 beneath the wing. In each instance the aircraft is illustrated as having four such engines, two, side-by-side, at each side of the fuselage 9. The nacelle 8 in which each engine 7 is housed provides an air intake 10 that is in front of the engine and leads rearwardly into it, and an exhaust gas duct 11 that extends coaxially behind the engine and normally opens rearwardly.

Figure 3:
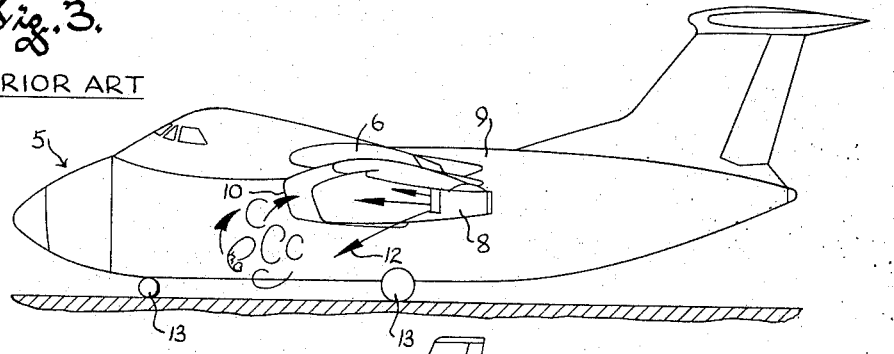
FIGURE 3 is a view in side elevation of an airplane equipped with one type of prior expedient for utilizing its turbojet engines to effect braking during the landing roll.
Figure 4:
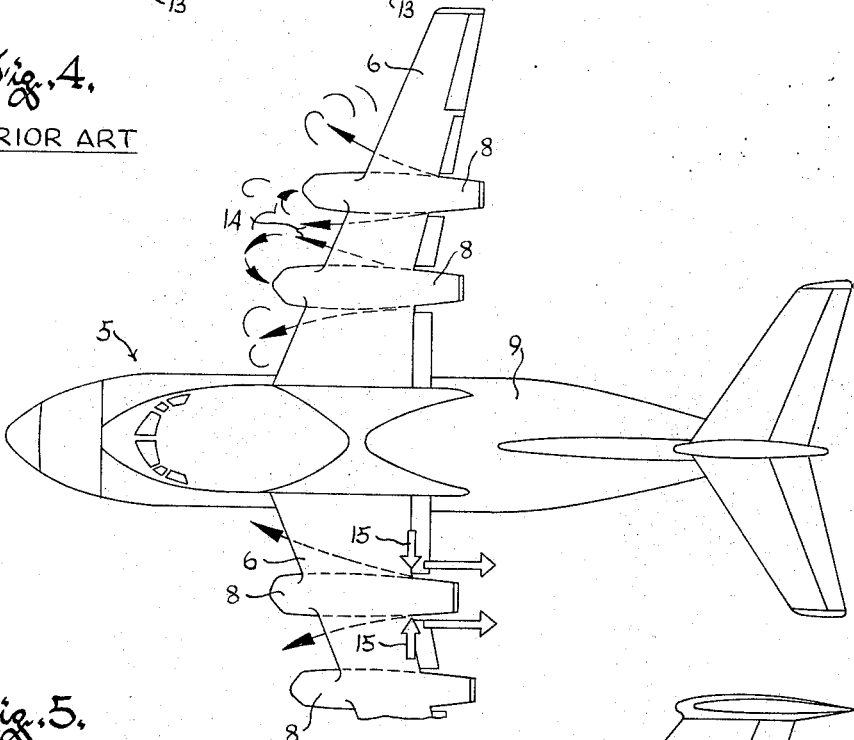
FIGURE 4 is a top plan view of the prior airplane shown in FIGURE 3.
Figure 5:
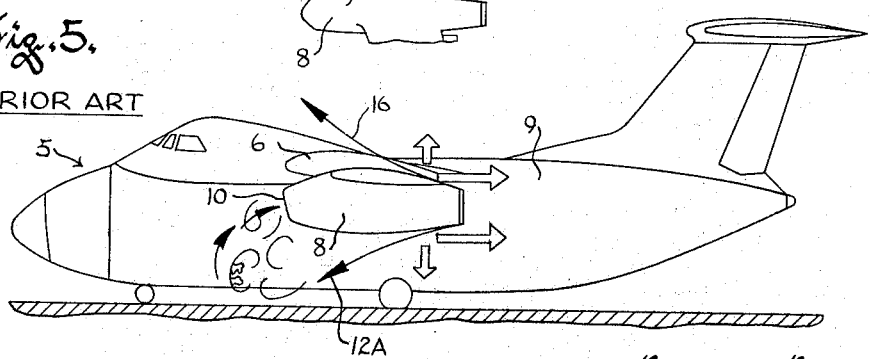
FIGURE 5 is a view generally similar to FIGURE 3 but illustrating another prior expedient for using engine power to effect landing roll deceleration.

For the best understanding of the present invention and its advantages, brief consideration should be given to the prior art arrangements illustrated in FIGURES 3, 4 and 5.

During braking, the deflecting means of one prior art arrangement, illustrated in FIGURES 3 and 4, imparted a downward component to a portion of the forwardly deflected exhaust gases and imparted to other portions thereof lateral components to opposite sides of the engine. The downwardly deflected exhaust gases, designated 12, impinged against the runway just ahead of the nacelles and tended to blow up loose materials, which could be sucked into the engine air intakes 10. Furthermore this downwardly deflected portion of the exhaust gases exerted an upward reaction which tended to lighten the load on the wheels 13 and thereby reduced rolling friction. The laterally-forwardly deflected portions of the exhaust gases from adjacent engines, designated 14, tended to repel one another as they moved forwardly, as may be seen from FIGURE 4, and hence there was danger that the exhaust gas from each engine would be sucked back into it, thus causing a recirculation which reduced thrust. The lateral force components of the sidewardly-forwardly deflected gas portions, designated by arrows 15, cancelled each other, inasmuch as they were substantially equal in magnitude and opposite in direction, and therefore they made no contribution to deceleration of the aircraft although a substantial portion of the available thrust of the engine was expended in producing them.

In the prior arrangement illustrated in FIGURE 5 the engine nacelles projected behind the wing a substantial distance and the outlets for deflected exhaust gas were located behind the trailing edge of the wing. For deceleration, a portion of the exhaust from each engine was directed forwardly and downwardly, as indicated at 12a, while the remainder was directed forwardly and up over the wing, as indicated at 16. In this case, again, the downwardly directed exhaust gases 12a could blow up loose materials that could be sucked into the engine air intakes. While the upward thrust reaction from the downwardly deflected gases 12a was substantially cancelled by the downward thrust reaction of the gas 16 that was directed upwardly over the wing, these substantially balanced verical components of the total thrust reaction were wasted inasmuch as they had no effect on deceleration, although a substantial portion of the available engine thrust was expended in producing them.

With the arrangement according to the present invention (as best seen in FIGURE 1) all of the engine exhaust gases, during ground roll braking, are conducted to spanwise extending slots 17 near the trailing edge of the wing, whence they issue in the form of forwardly and upwardly inclined flow sheets or flow curtains 18, all portions of which are spaced above the upper surface of the wing. It is immediately apparent that the gases thus emitted directly produce a rearward reaction component, symbolized by the arrow 19 in FIGURE 2, which has a very substantial decelerating effect. It is also apparent that the emitted gases produce an unbalanced downward reaction component which is symbolized by the arrow 20 and which in effect increases the load on the wheels 13 to increase their rolling friction and improve wheel braking action and directional control.

In addition, the forwardly-upwardly inclined flow curtains 18 cooperate with the upper surface of the wing to define wedge-shaped pockets 21 which catch relatively rearwardly moving air and thus impose a further load force upon the wheels 13 and a further deceleration force upon the aircraft. Ahead of the air flow curtains there is formed an overpressure on the wing which is responsible for an induced downwardly directed force, designated by an arrow 22. Furthermore, the flow sheets 18 effect a separation of air flow around the wing that greatly increases air drag, producing the additional induced deceleration force symbolized by arrow 23.

It will be observed that the flowing curtains 18 of exhaust gases in effect act as if they were flexible sheets of fabric or the like, so disposed as to be highly effective in catching the air through which the airplane is moving, and hence the total deceleration forces produced by the means of this invention, because they include the induced forces just mentioned, are substantially greater than would result from engine thrust reaction alone.

In order for the flow sheets to be fully effective, they must emanate from slots 17 in the wing that are near its trailing edge. Therefore each engine is preferably mounted with its exhaust gas outlet 25 spaced a distance forwardly of the wing trailing edge, and means are provided for deflecting engine exhaust gases upwardly into spanwise extending plenum chambers 27 in the wing, near its trailing edge, that open upwardly through the slots 17. To this end each nacelle has a port 28 in its top that opens from the exhaust gas outlet 11 therein and directly into the bottom of the plenum chamber 27 above it, and there are movable deflector flaps 29 and 30 in the nacelle of a type generally known in the art. In their normal positions the deflector flaps are retracted to define portions of the inner surface of the duct 11 and to close the port 28 so that exhaust gases from the engine can flow unobstructedly rearwardly through said duct. By means of suitable hydraulic cylinders (not shown) or other conventional actuators, the deflector flaps can be swung to a braking position (in which they are illustrated) wherein they open the port 28 and block the duct rearwardly of the port so as to deflect all of the engine exhaust gases upwardly into the bottom of the plenum chamber.

The front and rear walls 31 and 32, respectively, of the plenum chamber converge upwardly to a substantial extent, to encourage the exhaust gases flowing upwardly therethrough to distribute themselves spanwise along it. Preferably such convergence of the walls is mainly due to a marked forward and upward inclination of the rear wall 32, which thus imparts an initial forward deflection to the upwardly flowing exhaust gases.

The outlet from the plenum chamber is of course the chordwise narrow, spanwise extending slot 17, and that slot is defined by structure which is arranged to impart to the exhaust gases the desired forwardly and upwardly inclined direction of flow and is thus, in effect a nozzle. The means defining this nozzle comprises a plate or flap 34 which is hinged to the fixed structure of the wing for swinging motion between open and normal positions and is actuated by a hydraulic cylinder 35 or similar mechanism. In its normal position the plate or flap 34 closes the plenum chamber outlet and defines a portion of the top surface of the wing; and in its open position, in which it is illustrated, it is inclined forwardly and upwardly at an acute angle to the portions of the upper wing surface that are immediately adjacent to it. It will be understood that actuation of the plate or flap 34 is suitably coordinated with actuation of the deflector flaps 29 and 30.

Figure 6:
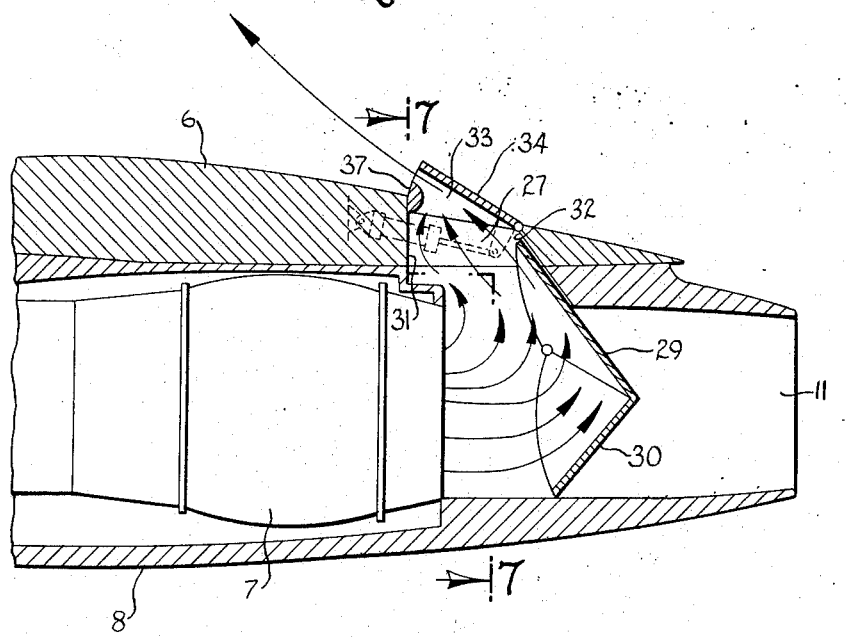
FIGURE 6 is a longitudinal sectional view of a portion of the wing, nacelle and engine of an airplane incorporating a slightly modified embodiment of the present invention.
Figure 7:
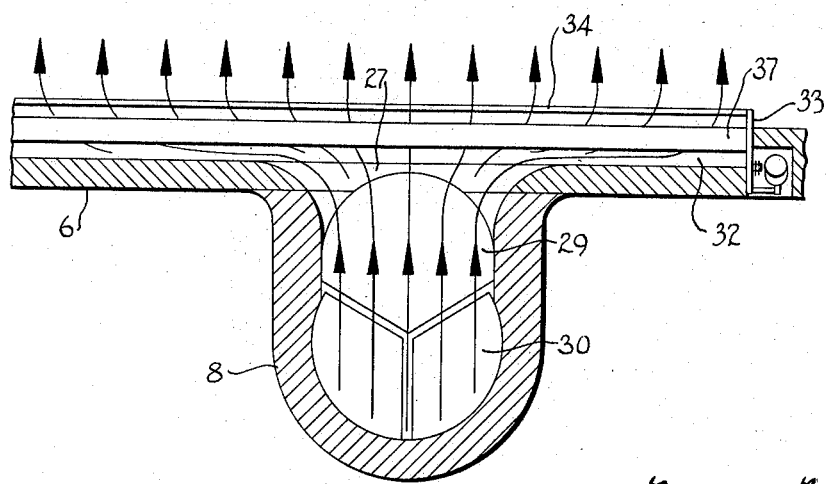
FIGURE 7 is a sectional view taken on the plane of the line 7—7 in FIGURE 6.

In the embodiment of the invention illustrated in FIGURES 2, 6 and 7, the hinged plate or flap 34, when in its open or braking position, forms the upper rear wall of the slot-like nozzle and is forwardly inclined at a slight obtuse angle to the rear wall 32 of the plenum chamber. The opposite spanwise extending surface of the nozzle should also participate in imparting an oblique forward-upward direction to the exhaust gases issuing from the plenum chamber and should prevent them from flowing forwardly along the top surface of the wing, so that this portion of the wing structure will not be subjected to a temperature increase that might affect its structural strength. In the embodiment of the invention illustrated in FIGURE 2, the forward-lower wall of the nozzle is defined by a narrow spanwise extending flap or plate 36 that is hinged at its trailing edge and normally lies flush with the upper surface of the wing, but which swings upwardly during landing roll braking to a forwardly and upwardly inclined attitude in which it is substantially parallel to the flap or plate 34. In the embodiment of the invention illustrated in FIGURES 6 and 7, the front-lower wall of the nozzle comprises a bead-like spanwise extending sealing member 37, spaced below the flap 34 and carried on brackets 33 that project downwardly from said flap at intervals along the length thereof. In the normal position of the flap 34 the sealing member 37 is disposed in the plenum chamber, but during braking the sealing member has its top spaced above the forwardly adjacent portion of the upper wing surface.

Figure 8:
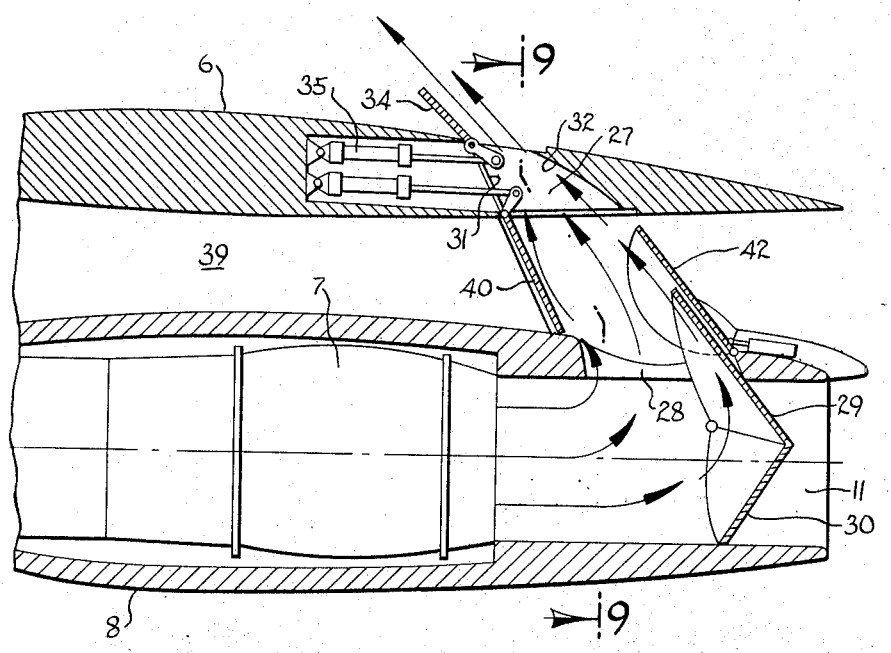
FIGURE 8 is a view generally similar to Figure 6 but showing a further modified embodiment of the invention.
Figure 9:
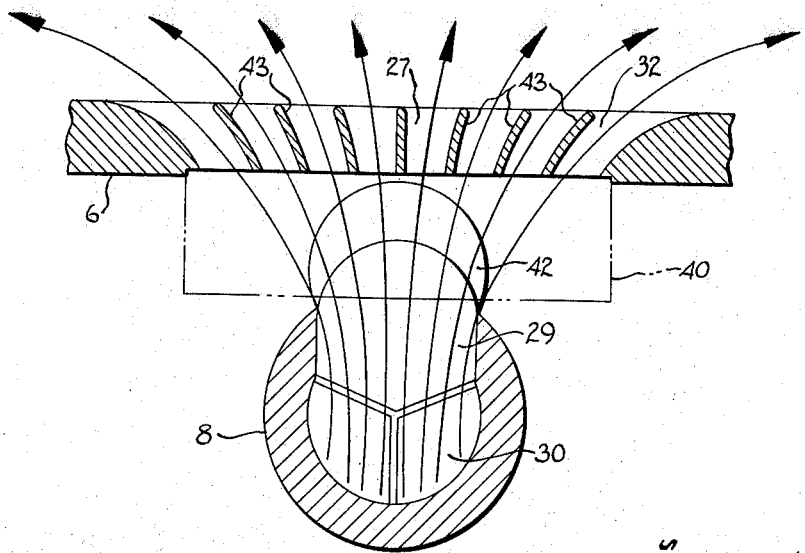
FIGURE 9 is a sectional view taken on the plane of the line 9—9 in FIGURE 8.

In the embodiment of the invention illustrated in FIGURES 8 and 9, the flap 34 which normally closes the plenum chamber is hinged to the top of the front wall 31 thereof to swing through substantially more than 90° in moving between its normal and its braking positions. The upper-rear wall of the plenum chamber outlet nozzle is defined by the upper portion of the plenum chamber rear wall 32, which is inclined at a substantial forward angle; and the flap 34 provides, in effect, a continuation of the front wall 31 of the plenum chamber which is also forwardly inclined but is more nearly vertical than the rear wall 32.

In other respects the embodiment of the invention illustrated in FIGURES 8 and 9 differs from those previously described in that the nacelle 8 there shown is carried on a pylon 39 beneath the wing, spaced beneath the bottom surface of the wing. In this case, again, the nacelle has an outlet port 28 in its top, opening from the exhaust gas duct 11 therein, which port is normally closed by one of the deflector flaps 29 but is opened when the deflector flaps 29, 30 are moved to their braking positions in which they block the rear of the exhaust gas duct 11 and divert engine exhaust gases through said port 28.

In the FIGURES 8 and 9 embodiment, a flap 40 which is hingedly connected to the bottom of the wing normally closes the inlet to the plenum chamber 27 and defines a portion of the undersurface of the wings. The flap 40 swings about its leading edge, and is actuated by a hydraulic cylinder or similar mechanism that is coordinated with the actuators for the flap 34 and deflector flaps 29 and 30. In its braking position, in which it is illustrated in FIGURE 8, the flap 40 extends obliquely downwardly and rearwardly to have its lower edge adjacent to the nacelle and just ahead of the front edge of the port 28 therein. In this braking position the flap 40 forms the front wall of a duct by which exhaust gases are conducted from the port 28 to the inlet of the plenum chamber 27. The rear wall of that duct is provided by a flap 42 on the nacelle which normally forms a part of the outer nacelle surface, covering the port 28 therein, and which pivots at its trailing edge for swinging to a forwardly and upwardly inclined braking position in which it defines substantially a continuation of the rear wall 32 of the plenum chamber.

As illustrated in FIGURE 9, the plenum chamber can be bridged, at intervals along its length, by chordwise extending upwardly divergent vanes 43 that effect a substantially uniform spanwise distribution of the exhaust gases flowing therethrough during braking.

From the foregoing description taken with the accompanying drawings it will be apparent that this invention provides very effective means on a fixed wing aircraft powered by turbojet engines for utilizing the thrust of the engines to effect aerodynamic braking during the landing roll.

What is claimed as my invention is:

1. In an aircraft having a fixed main wing and having a nacelle beneath the wing that houses a turbojet engine and defines an exhaust gas outlet duct that extends rearwardly from the engine:
    (A) means defining a spanwise extending plenum chamber in the wing having an inlet at its bottom communicable with the outlet duct in the nacelle;
    (B) deflector means in the nacelle movable between a normal position blocking said inlet to the plenum chamber while leaving the outlet duct unobstructed, and a diverting position substantially blocking the rear of the outlet duct while permitting communication through said inlet so as to compel exhaust gases from the engine to flow into the plenum chamber; and
    (C) means defining a spanwise extending slot-like nozzle providing an outlet from said plenum chamber at the top of the wing and near its trailing edge by which exhaust gases are caused to issue from the plenum chamber in a sheet-like flow that is inclined forwardly and upwardly over the wing,
        said means comprising a flap-like element hingedly connected to the upper portion of the wing to swing between an outlet defining position in which said element is forwardly and upwardly inclined relative to its adjacent upper surface portions of the wing and a normal position in which said element closes the plenum chamber and defines a portion of the upper surface of the wing.

2. The method of aerodynamically braking an aircraft having a fixed main wing and having a nacelle beneath the main wing that houses a turbojet engine by which the aircraft is normally propelled, which method is characterized by:
    (A) deflecting exhaust gases from the engine upwardly into the wing;
    (B) imparting a spanwise component of flow to the exhaust gases as they flow upwardly through the wing; and
    (C) constraining the exhaust gases to flow out of the top of the wing from near the trailing edge thereof in a spanwise extending sheet and with a forwardly and upwardly inclined direction of flow relative to the upper surface of the wing.

3. An aircraft having a fixed main wing and having a nacelle beneath the wing that houses a turbojet engine by which the aircraft is normally propelled, characterized by:
    (A) the wing having a spanwise extending plenum chamber therein;
    (B) means for deflecting engine exhaust gases upwardly into said plenum chamber; and
    (C) means defining a spanwise elongated, chordwise narrow nozzle providing the outlet from said plenum chamber, near the trailing edge of the wing, by which exhaust gases issuing from the plenum chamber are directed obliquely forwardly and upwardly across the upper surface of the wing in a spanwise extended flow sheet.

4. The aircraft of claim 3, further characterized by: the outlet of said nozzle being spaced above the top surface of the wing to prevent exhaust gases that issue therefrom from flowing in contact with the wing surface.

5. The aircraft of claim 3, further characterized by: said nozzle defining means comprising a flap hingedly connected to the top of the wing and swingable between a normal closed position overlying and closing the plenum chamber and defining a portion of the upper surface of the wing, and a forwardly and upwardly inclined braking position.

References Cited

UNITED STATES PATENTS

| | | | |
|---|---|---|---|
| 2,991,961 | 7/1961 | Rogallo et al. | 244—42 |
| 3,285,538 | 11/1966 | Burnelli | 244—55 X |
| 3,442,470 | 5/1969 | Farbridge et al. | 244—42 |

MILTON BUCHLER, Primary Examiner

J. E. PITTENGER, Assistant Examiner

U.S. Cl. X.R.

60—229; 239—265.27; 244—42, 110